United States Patent

Park

[11] Patent Number: 5,862,875
[45] Date of Patent: Jan. 26, 1999

[54] DIFFERENTIAL CONTROL UNIT FOR FRONT AND REAR WHEELS OF A 4-WHEEL DRIVE VEHICLE

[75] Inventor: Byong K. Park, Kyungki-do, Rep. of Korea

[73] Assignee: Hyundai Motor Company, Seoul, Rep. of Korea

[21] Appl. No.: 656,556

[22] Filed: May 31, 1996

[30] Foreign Application Priority Data

May 31, 1995 [KR] Rep. of Korea ................. 95-14258

[51] Int. Cl.$^6$ ................. B60K 17/35; F16H 48/20
[52] U.S. Cl. ................. 180/248; 180/249; 192/94
[58] Field of Search ................. 180/248, 249, 180/250; 192/54.51, 94

[56] References Cited

U.S. PATENT DOCUMENTS

| | | | |
|---|---|---|---|
| 2,091,268 | 8/1937 | Colman | 192/94 |
| 3,235,045 | 2/1966 | Pop | 192/94 |
| 3,419,118 | 12/1968 | Allaben, Jr. | 192/94 |
| 3,507,374 | 4/1970 | Allaben, Jr. | 192/94 |
| 4,298,085 | 11/1981 | Moroto et al. | 180/248 |
| 4,817,751 | 4/1989 | Asano et al. | 180/223 |
| 4,848,506 | 7/1989 | Shimada et al. | 180/249 |
| 4,905,808 | 3/1990 | Tomita et al. | 180/249 |
| 4,949,594 | 8/1990 | Galhorta | 180/248 |
| 4,966,267 | 10/1990 | Carlton | 192/94 |
| 4,976,347 | 12/1990 | Sakakibara et al. | 192/20 |
| 5,056,640 | 10/1991 | Yamamoto | 180/248 |
| 5,314,039 | 5/1994 | Hock | 180/249 |
| 5,631,829 | 5/1997 | Takasaki et al. | 180/248 |

FOREIGN PATENT DOCUMENTS

| | | |
|---|---|---|
| 1261437 | 10/1961 | France . |
| 2630055 | 10/1989 | France . |
| 6-11217 | 3/1994 | Japan . |
| 878700 | 10/1961 | United Kingdom . |
| 221272 | 1/1990 | United Kingdom . |

Primary Examiner—James R. Brittain
Assistant Examiner—John L. Beres
Attorney, Agent, or Firm—Christie, Parker & Hale, LLP

[57] ABSTRACT

A differential control unit for a 4-wheel drive vehicle is disposed between a transmission and a propeller shaft, controls a violator of the speed regulations between front and rear wheels generated when turning the 4-wheel drive vehicle, and limits the torsion stress by its violator of the speed regulations so that it can improve driving performance and keep the vehicle stable. The differential control unit for limiting a differential includes a screw shaft for connecting to the transfer case and transmitting a turning effect, a piston for moving forward and backward relative to the shaft portion, a multiple disc clutch for differential control according to the existence and non-existence of friction created by the forward and backward motion of the piston, a spline gear forming the spline gear on the outer circumference to pass through the inner circumference of the multiple disc clutch, and a housing connected and fixed to the propeller shaft to equip components of a third stopper disposed for supporting the spline gear.

4 Claims, 5 Drawing Sheets

DIFFERENTIAL CONTROL UNIT FOR FRONT AND REAR WHEELS OF A 4-WHEEL DRIVE VEHICLE

BACKGROUND OF THE INVENTION

The present invention relates to a differential control unit for front and rear wheels of a 4-wheel drive vehicle which is disposed on a propeller shaft for connecting a transmission and a differential gear of the 4-wheel drive vehicle so as to improve driving performance and keep the vehicle stable by absorbing and controlling the speed difference generated between the front and rear wheels and by limiting the torsion stress when turning.

In general, because speed difference is generated between front wheels and rear wheels when turning the 4-wheel drive vehicle, it causes relative spin in the wheels and torsion in the driving system so that it affects driving performance.

A specific tight corner braking phenomena occurs in the 4-wheel drive vehicle due to a difference of radius of gyration between the front and rear wheels, and more particularly due to the difference of the number of rotations according to the big radius of gyration for the front wheel and the small radius of gyration for the rear wheel when turning the vehicle.

The difference of radius of gyration causes forced slipping of the wheels or torsion stress of the driving system in parts like the propeller shaft. This results in locking the driving system and thereby braking the vehicle.

The braking phenomena of the driving system has a harmful influence upon rigidity of the propeller shaft and also on smooth turning of the vehicle, and causes loss of power.

As the propeller shaft of the 4-wheel drive vehicle is a direct connecting type, the rear wheels having small rotative velocity slip because of the speed difference between the front and rear wheels when turning the vehicle. Accordingly, driving performance and stability of the vehicle drops.

In addition, because torsion stress occurs while turning the vehicle causing the vehicle body to vibrate, when designing the vehicle, the size and weight of the propeller shaft should be increased to reduce vibration.

In recent years, a viscose coupling has been used to solve the problem. However, the viscose coupling has a complex structure and increases manufacturing costs.

SUMMARY OF THE INVENTION

It is an objective to provide a differential control unit of a 4-wheel drive vehicle which is disposed between a transmission and a propeller shaft, and improves running performance and stability of the vehicle by preventing occurrence of torsion stress by absorbing a speed difference of the speed regulations and controlling rotational speed difference between front and rear wheels.

To achieve the objective, the invention provides a differential control unit which is disposed on a propeller shaft for connecting a transmission and a differential gear so as to prevent occurrence of torsion stress and a differential limit, and at the same time, absorb the speed difference between front and rear wheels when turning the 4-wheel drive vehicle.

The differential control unit includes a screw shaft for connecting to the transfer case and transmitting turning effect, a piston for moving forward and backward the shaft portion, a multiple disc clutch for differential control according to existence and nonexistence of friction caused by forward and backward motion of the piston, a spline gear forming spline gear on the outer circumference to move straight the multiple disc clutch, and a housing connected and fixed to the propeller shaft so as to equip components of a stopper disposed for supporting the spline gear.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION

A preferred embodiment of the present invention will now be described in detail with reference to the accompanying drawings.

Figure 1:
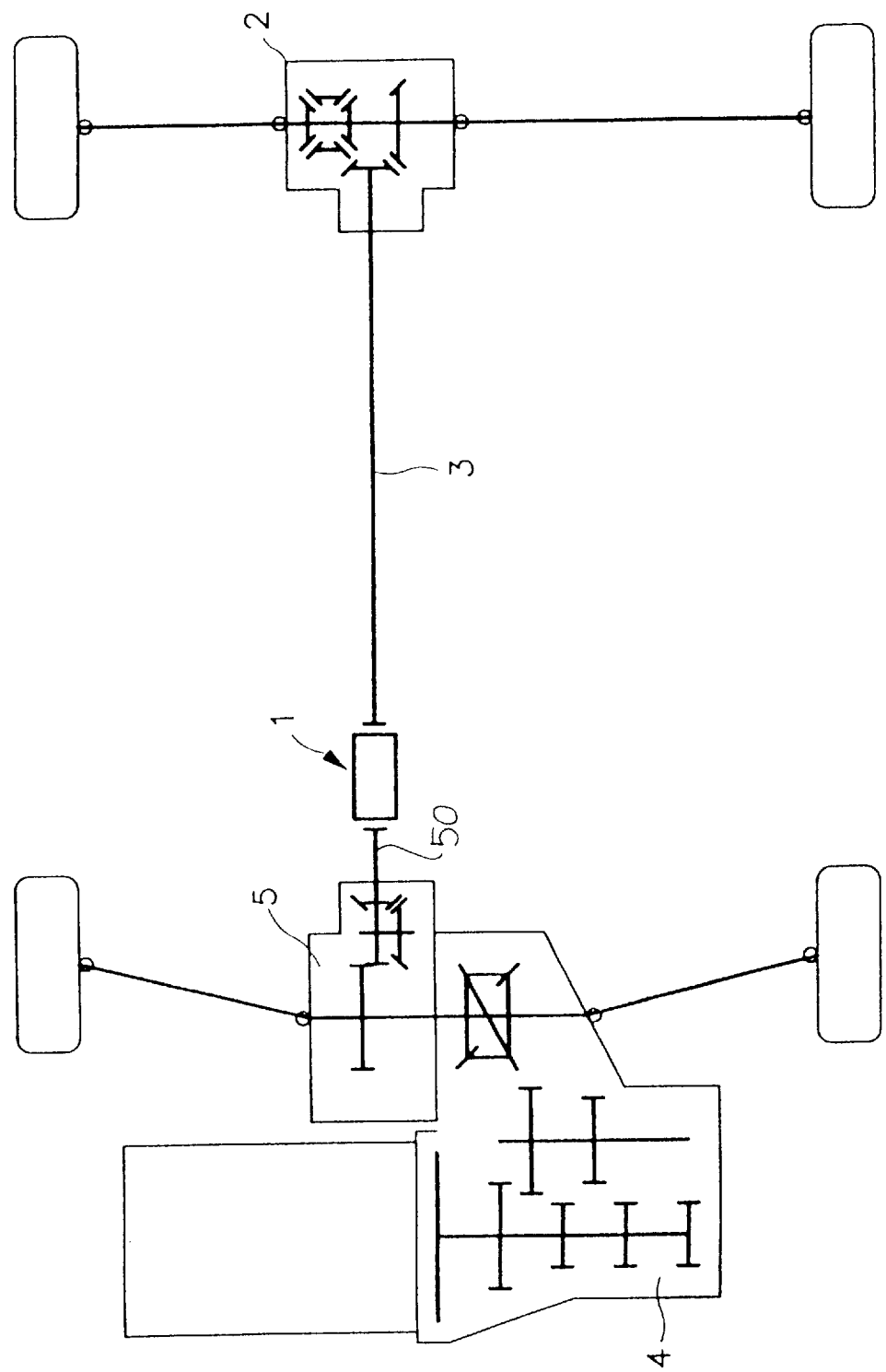
FIG. 1 is a schematic view illustrating a differential control unit between front and rear wheels in accordance with a preferred embodiment of the present invention.

Referring first to FIG. 1, there is illustrated a front-rear differential control unit between front and rear wheels according to an embodiment of the present invention, and reference numeral 1 refers to the differential control unit.

The differential control unit 1 is a device for absorbing a speed difference of speed regulations so as to prevent torsion stress and for controlling a rotational speed difference between the front and rear wheels when turning a 4-wheel drive vehicle.

The differential control unit 1 is disposed on a propeller shaft 3 for connecting a differential gear 2 with a transfer-case 5 of a transmission 4.

The differential control unit 1 includes a screw shaft 6 (FIG. 2) disposed on the end of a connecting shaft 50 of the transfer-case 5 so as to be rotated by the power of the transmission.

Figure 2:
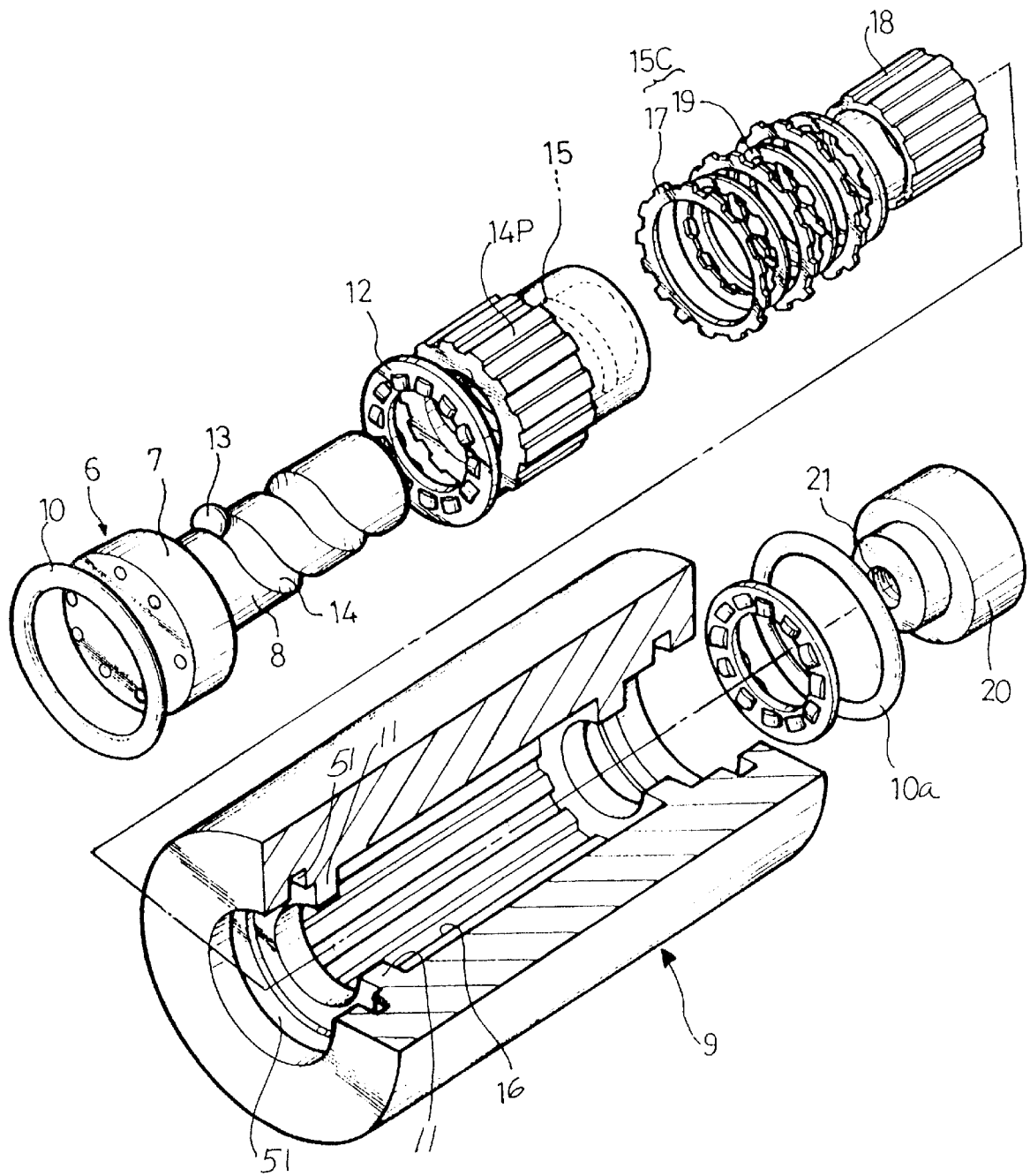
FIG. 2 is an exploded perspective view illustrating a differential control unit in accordance with a preferred embodiment of the present invention.
Figure 3:
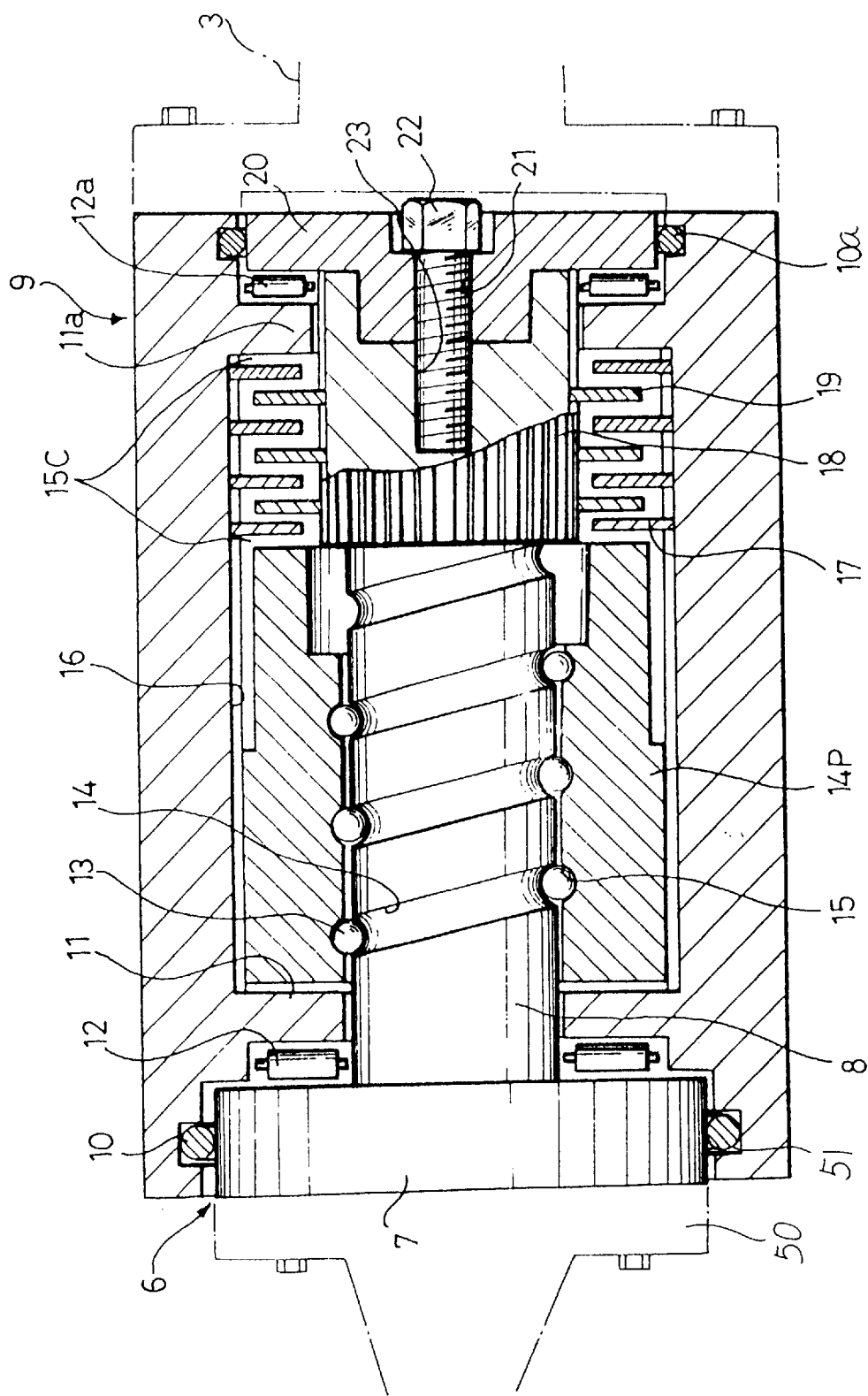
FIG. 3 is a sectional side view illustrating a differential control unit between front and rear wheels in accordance with a preferred embodiment of the present invention.

FIGS. 2 and 3, respectively illustrate an exploded perspective view, disassembling the front and the rear of the differential control unit and a sectional side view of the differential control unit in accordance with a preferred embodiment of the present invention. In the differential control unit 1, one rotational element comprises a screw shaft 6 which is formed with a head portion 7 and a shaft portion 8. A sealing member 10 is inserted in an inner circumference groove 51 of a housing 9, which is another rotational element, in which the head portion 7 is displaced. The housing 9 is provided with a first stopper 11 and a plurality of needle bearings 12 are disposed between the first stopper 11 and the head portion 7 for smooth rotation therebetween.

A spiral groove 14 is formed on an outer circumference of the shaft portion 8 of the screw shaft 6 so that metal balls 13 can move along the spiral groove when the shaft 6 rotates.

A piston 14P also a rotational element, having an internal circumferential guide groove 15 which acts as a passageway for the metal balls 13 with the spiral groove 14 of the screw shaft 6 is disposed around the shaft portion 8 of the screw shaft.

As the metal balls 13 move in a direction guided along the spiral groove 14 according to the rotation of the screw shaft 6, the piston 14P is disposed so as to move rectilinearly in alternating fashion forward and backward relative to the shaft portion 8. The piston 14P is housed inside the housing 9 and has a splined outer surface to engage an inner spline gear on the inner surface of the housing thereby rotationally fixing the piston 14P relative to the housing but allowing relative longitudinal motion.

A multiple disc clutch 15C is formed with outwardly splined sliding brake plates 17 and inwardly splined sliding brake discs 19, and it can move longitudinally. The brake plates 17 are combined with the inner spline gear 16 which is formed in the inner circumference of the housing 9 and the brake discs 19 are longitudinally slidable disposed on the outer circumference of a spline gear 18 which is formed with the screw shaft, so as to contact and frictionally engage the brake plates 17.

As the multiple disc clutch 15C is pressed by moving piston 14P rearward toward the clutch 15C, contact friction is generated between the brake plates 17 and the brake discs 19. Accordingly, the housing 9 is rotated by the contact friction, whereby power transmission is completed, and the internal components are stabilized.

A third stopper 20 is fixed to an end of the spline gear 18 by a bolt 22. The bolt 22 passes through a coupling hole 23 formed around the inner circumference of the spline gear 18, and a screw hole 21 is formed around the inner circumference of the third stopper 20 corresponding to the coupling hole 23 so as to fix the spline gear 18 and the third stopper 20.

A plurality of needle bearings 12a are disposed between the third stopper 20 and the second stopper 11a formed around the inner circumference of the housing 9 so as to decrease friction generated between them.

A sealing member 10a is inserted in the outer circumference of the third stopper 20 so as to seal with the housing 9. The differential of the 4-wheel drive vehicle is accomplished by connecting the housing 9 to the propeller shaft 3.

Figure 5:
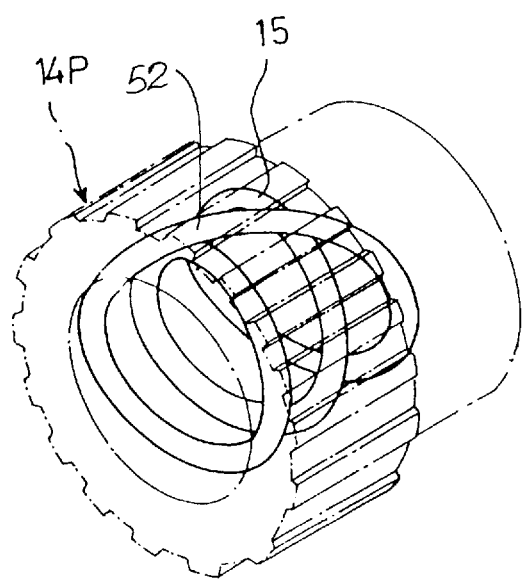
FIG. 5 is a partially cutaway perspective view illustrating a guide groove of a piston in accordance with a preferred embodiment of the present invention.

FIG. 5 illustrates a partially cutaway perspective view of a piston 14P in accordance with a preferred embodiment of the present invention. A spiral-type guide groove 15 is formed in the inner circumference of the piston 14P. Because a number of metal balls 13 are inserted in the guide groove 15, the metal balls absorb the transmitted power so as to not allow transmission of the power when the piston 14P, which moves longitudinally left or right, is displaced to one end of the differential control unit 1. The operation of the above is due to the guide groove having a structure so that the metal balls 13 can infinitely move along the guide groove 15. That is, the guide groove 15 has a return portion 52 connecting the ends of the guide groove.

Figure 4:
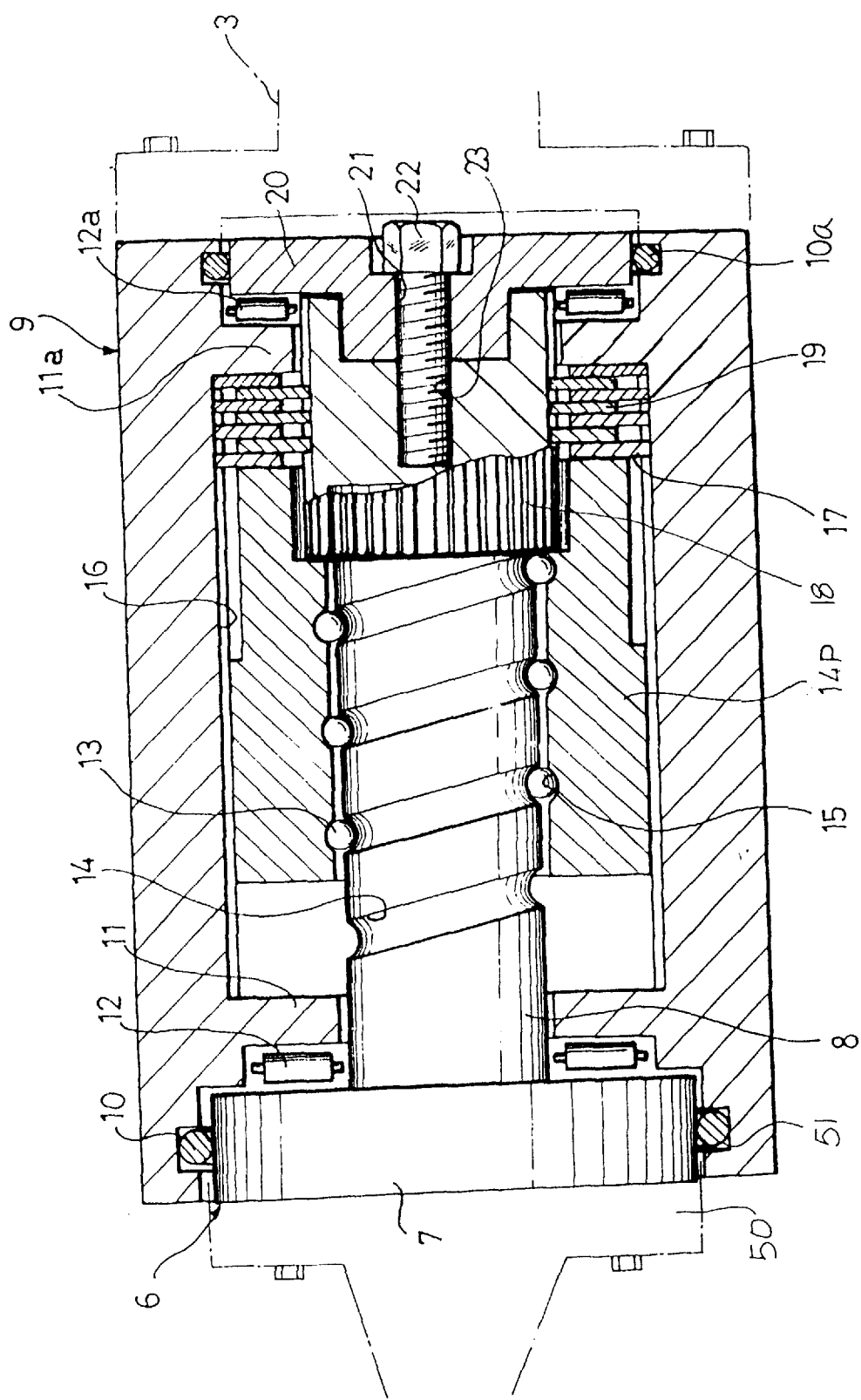
FIG. 4 is a view illustrating differential operation of a differential control unit for front and rear wheels in accordance with a preferred embodiment of the present invention.

In the above-described differential control unit, the rotative velocity of the front wheel is equal to the rotative velocity of the rear wheel when driving in a straight line. Accordingly, when the driving force is distributed from a transmission 4, the screw shaft 6 rotates faster than the piston 14P, and then the piston 14P moves to the right along the spiral type groove 14 and presses the multiple disc clutch 15C (as in FIG. 4) so that the differential control unit 1 operates as one body and transmits the driving force to the rear wheels.

When the vehicle turns, the radius of gyration of the front wheel is bigger than the radius of gyration of the rear wheel. Accordingly, the screw shaft 6 connected to the front wheel rotates faster than the housing 9 connected to the rear wheel.

As a result, the piston 14P moves left along the spiral groove 14 because the metal balls 13 act as threads. The multiple disc clutch 15C is unpressed by the moving piston 14P to the left, that is, toward the head portion 7. A slip occurring to the unpressed multiple disc clutch 15C and the multiple disc clutch 15C absorbs the power transmitted to the rear wheels within the limit. At this time, the piston 14P that is moved left cannot move any more because it contacts the first stopper 11 and the transmitted power is absorbed by the metal balls 13 moving along the guide groove 15 so that they allow easy operation and relative rotation between the piston 14P and the screw shaft 6.

Accordingly, the differential control unit 1 can absorb the torsion stress generated by rotatory difference between the screw shaft 6 and the housing 9. The piston 14P moves right again toward the clutch 15C and returns to the initial state when the vehicle is driven in a straight line after turning. Therefore, the differential control unit 1 is directly connected to shaft 3 and it rotates as one body.

For example, if the rear wheels are stuck in a puddle and they lose driving force, the piston 14P moves left and it diminishes pressure applied to the multiple disc clutch 15C so that slippage occurs with the result of a velocity difference between the front wheel and the rear wheel.

When the transmission of power is intercepted through the multiple disc clutch 15C, the vehicle can easily escape from a rough road or a puddle or an icy road because maximum power is transmitted to the front wheels.

The invention can absorb in itself the velocity difference between the front wheel and the rear wheel, transmits stable driving force to the front wheel and the rear wheel, improves driving performance and keeps the vehicle stable by absorbing and controlling a speed difference of the speed regulations generated between the front and the rear wheel and by limiting the torsion stress when turning. Also, because the invention is lower in weight than the prior propeller shaft and can be manufactured so as to be compact, it can decrease manufacturing costs and reduce fuel consumption.

In addition, the invention can distribute the driving force of the front and rear wheels corresponding to road conditions so that it can improve driving performance and keep the vehicle stable.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A differential control unit between front and rear wheels of a 4-wheel drive vehicle, disposed on a propeller shaft for connecting the vehicle's transmission to the vehicle's differential gear to control rotational differences and torsion stress between the front and rear wheels when turning the vehicle, the differential control unit comprising:

a first rotating element connected to the transmission;

a second rotating element connected to the differential gear; and means for directly transmitting rotating force of the first rotating element to the second rotating element when the vehicle is driven in a straight line and generating slippage between the first and second rotating elements when turning the vehicle; and a piston for operating the transmitting means, wherein the first rotating element is a screw shaft having a spline gear formed on one end thereof, wherein the second rotating element is a housing disposed around the screw shaft, and wherein the screw shaft comprises a head portion connected to the transmission, a spiral groove for receiving a metal ball, and a shaft portion in an inner circumference of the piston, the ball moving the piston forward and backward.

2. The differential control unit according to claim 1 further comprising a guide groove in the piston and wherein the transmitting means comprises a multiple disc clutch, wherein the piston comprises a splined outer surface meshing with an inner spline gear on an inner circumference of the housing for rectilinear alternating motion in the inner circumference of the housing, and wherein the metal ball is received between the spiral groove and the guide groove for transmitting power to the piston, so that the multiple disc clutch is pressed by the piston moving rearward, and the power is transmitted or intercepted.

3. The differential control unit according to claim 1 further comprising a circular stopper, and a bolt connecting the stopper and the spline gear on the screw shaft so that internal components of the differential control unit are stabilized when power is transmitted.

4. The differential control unit according to claim 1, wherein the multiple disc clutch comprises a plurality of first discs, each splined on its outer circumference and engaging the inner spline gear on the inner surface of the housing, and a plurality of second discs, each splined on its inner circumference and engaging the spline gear formed on the end of the screw shaft, whereby the first discs and the second discs are selectively engaged through friction with each other in response to movement of the piston.

\* \* \* \* \*